3,156,679
METHOD OF POLYMERIZING NITRO ALCOHOL ESTERS OF ACRYLIC AND METHACRYLIC ACIDS
Herman T. Roy, Jr., Cleveland Heights, Ohio, assignor to The General Tire and Rubber Company, Akron, Ohio, a corporation of Ohio
No Drawing. Filed Sept. 1, 1949, Ser. No. 113,674
4 Claims. (Cl. 260—89.5)

The present invention relates to the preparation of polymers from one or more monomeric materials comprising a nitro alcohol ester of acrylic and methacrylic acids.

Nitroethyl acrylate and esters of higher nitro alcohols having one or more nitro groups form polymeric compositions having unique properties. The esters of acrylic and methacrylic acids with the lower nitro alcohols, such as beta-nitroethyl alcohol and the higher nitro alcohols having a plurality of nitro groups, such for example as 2,2-dinitropropanol, and compounds such as 2-nitro-1,3-propanediol, 2,2-dinitropropanediol and the like, containing at least one nitro group and a plurality of oxygen atoms, have sufficient oxygen to render the polymers desirable as combustible fuels or propellants for rockets, jets and the like.

In the polymerization of nitro alcohol esters of acrylic acid and nitro alcohol esters of methacrylic acid, very substantial amounts of heat are liberated and the temperature is likely to rise to a dangerous point. This is particularly the case in the preparation of large castings suitable as propellant grains in rockets or jets. If the rate of evolution of heat is sufficiently great, decomposition of the polymers or monomers may occur. Even violent explosions of the polymers or polymerizing material may result.

We have found that the rate of exothermic heat liberated during the polymerization is surprisingly dependent to a very large measure upon what free radical-producing catalyst is used for accelerating or causing the polymerization to occur. When acrylic or methacrylic esters of nitro alcohols are polymerized with the commonly used free radical-producing catalyst, e.g. benzoyl peroxide, acetyl peroxide, cumene hydroperoxide, etc., the temperature during polymerization of even only moderately sized castings is in sufficiently high range to cause decomposition of the monomer or polymer. This decomposition may be of such a degree, providing a sufficient number of nitro groups are present, to cause a violent shattering explosion. Mere reduction in amount of catalyst, such as benzoyl peroxide, etc. (before deemed an equivalent) has not solved the problem, for when the amount of such catalyst was sufficiently reduced for safety, etc., the polymerization rate was so lengthened that the process was unfeasible.

It is an object of the present invention to provide a casting, particularly a large casting comprising at least one polymer of a nitro alcohol ester of acrylic and/or methacrylic acids in which portions of the materials have not been decomposed.

It is another object to provide a method of making such castings.

Other objects will be apparent from the following description of the invention.

I have found that free radical-producing catalysts that accelerate polymerization in a given time do not act the same. The class of free radical-producing catalysts known as aliphatic percarbonates have acted quite differently from the commonly used free radical-producing catalysts, such for example as those above-mentioned, in that while they also accelerated the polymerization to a very substantial degree, the temperature reached in the polymer was very much lower than the temperature reached with the other above-mentioned free radical-producing catalysts. The maximum temperature reached was sufficiently low to permit the formation of very large castings without decomposition or explosion occurring.

The aliphatic percarbonates have the general formula

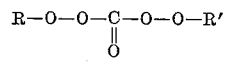

where R and R' may be any aliphatic radical, although those containing no other elements than carbon, hydrogen and oxygen are preferred. These percarbonates include the alkyl groups ethyl, methyl, propyl, isopropyl, butyl, secondary butyl, isobutyl, amyl, isoamyl, decyl, etc., the corresponding hydroxy-substituted alkyl groups, etc., and the aliphatic ether groups of the general formula —R'—O—R", where R' is any alkylene group such for example as ethylene, propylene, etc., and R" is alkyl as above.

In preparing the polymer, a small amount of one or more of the above aliphatic percarbonates are mixed with the monomeric materials. The mixture thus obtained is activated by bringing it to a temperature between 25° C. and 50° C., whereupon polymerization of the nitroacrylic compounds occurs at a reasonable rate and with a comparatively small rise in temperature. As little as .005% of a percarbonate, based on the weight of the monomeric materials, is noticeably effective in accelerating the polymerization of the above-mentioned nitro alcohol ester of acrylic and methacrylic acids. However, the aliphatic percarbonates are preferably present in a total amount of at least .01% or .015% of the weight of the monomeric materials in order to provide polymerization at a more reasonable rate. 2% or even more of these percarbonates may be present without appreciably deteriorating the product or too greatly accelerating the polymerization.

The above aliphatic percarbonates may be used to polymerize nitro alcohol esters of either acrylic or methacrylic acids, or mixtures of one or more of such esters of these acids, or they may be used to prepare copolymers of one or more of the above-mentioned esters with other monomeric materials, such as the acrylic and methacrylic esters, nitriles, etc. having an absence of nitro groups and including methyl methacrylate, methacrylate, methyl acrylate, ethyl acrylate, acrylonitrile and the like.

Any monomeric polymerizable material which has a positive "e" value and a "Q" value higher than that of vinyl chloride may be copolymerized with the above nitro alcohol esters. Such monomers include maleic anhydride, dichlorostyrene, acrylonitrile etc. "Q" and "e" values are defined in Journal of Polymer Science, volume 3, No. 5, pages 772–775, 1948, in the article entitled "Some Relative Monomer Reactivity Factors" by Dr. Charles C. Price, and also in an article on the same subject by Dr. Price and T. Alfrey in the Journal of Polymer Science, volume 2, page 101, 1947. Monomers such as styrene, vinyl acetate, etc. with negative "e" values apparently do not appreciably enter into copolymerization with the above nitro alcohol esters.

The following examples, in which parts are by weight, illustrate the present invention:

*Example 1*

| | Parts |
|---|---|
| Beta-nitroethyl acrylate | 100 |
| Isopropyl percarbonate | .05 |

The above materials were intimately mixed and the mixture was poured into a mold where it was allowed to remain in an atmosphere of 30° C. for 72 hours. Thereupon the temperature was raised to 50° C. for an additional 24 hours. The resultant product was a colorless and hard thermoplastic material.

Example 2

| | Parts |
|---|---|
| Beta-nitroethyl acrylate | 100 |
| Diacrylate of 2-bromo-2-nitro-1,3-propanediol | 25 |
| Isopropyl percarbonate | .1 |

The above ingredients were mixed as set forth in Example 1 and placed in an atmosphere of 40° C. for 60 hours. The resultant product was a colorless hard thermoplastic material.

Example 3

| | Parts |
|---|---|
| Diacrylate of 2,2-dinitro-1,3-propanediol | 100 |
| Isopropyl percarbonate | .015 |

The above ingredients were mixed and placed in an atmosphere maintained at 35° C. for 60 hours. The resultant product was a hard colorless plastic material.

All of the products in the above examples burn avidly. The absence of color in the resultant product shows that the monomer polymer did not decompose during the polymerization. The temperature in even large castings remains sufficiently low for safety. In place of the isopropyl percarbonate in the above examples, any of the other aliphatic percarbonates previously mentioned and included within the above-mentioned general formula may be used.

In place of the acrylates and diacrylates mentioned above, other acrylic or methacrylic esters of nitro alcohols may be substituted. Also, mixtures of nitro acrylates with other monomeric materials of partial polymers of monomers having a positive "$e$" value, as previously designated, may be used. Monomeric materials having a negative "$e$" value may also be present but serve primarily as plasticizing agents. Additional nitrogen-containing materials such as nitromethane, dinitropropane (another nitro aliphatic compound) may be present in admixture with the beta-nitro ethyl acrylate and other nitro acrylates or methacrylates to modify the properties of the polymers, particularly its ease of combustion.

In the preparation of rocket or jet fuels, the above nitro-containing polymers are especially desirable. Additional oxygen-supplying materials such as sodium or potassium persulfate, potassium perchlorate, pentaerythritol tetranitrate, tetryl and other solid oxygen-supplying organic compounds may also be mixed with or suspended in the monomeric materials to provide acceleration of the burning rate, if desired. In propelling solid bodies, the above polymers are combusted in a suitable chamber, such as the combustion chamber of a conventional rocket or jet motor, and the gasses of combustion at high pressure are conducted through a suitable nozzle where they are expanded to provide high velocity in a single direction and a reactive force in the opposite direction that propels the solid body.

The nitro-containing polymers of the present invention are suitable for various industrial applications as well as for combustible ingredients, however. Because of the extreme polarity of the nitro group, the heat distortion, solubility, etc. differ considerably from these properties in polyacrylic esters and the like.

The term "polymer" is used herein in its generic sense to include "copolymers" as well as "homopolymers."

Although the invention may be employed in various ways, only preferred embodiments have been illustrated and described. Other embodiments may be made within the invention as provided by the patent statutes.

What I claim is:

1. A method of polymerizing a liquid comprising an ester of a member of the group consisting of nitro alcohol esters of acrylic acid and nitro alcohol esters of methacrylic acid, which comprises mixing with said ester at least one alkyl percarbonate of the general formula

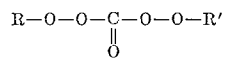

where R and R' are alkyl groups which consist of hydrogen and carbon, and thereafter subjecting the mixture to a temperature of at least 25° C. and not substantially in excess of 50° C. until a solid polymer is produced, said alkyl percarbonate being present in an amount of .005% to 2%, based on the weight of the polymerizable monomeric material in said liquid.

2. The method of claim 1 wherein said ester is beta-nitro ethyl acrylate.

3. The method of claim 1 wherein said ester is an ester of beta-nitro ethyl alcohol.

4. The method of claim 1 wherein said ester is an ester of 2,2-dinitro propanediol.

References Cited in the file of this patent

UNITED STATES PATENTS

| 2,378,169 | Agre et al. | June 12, 1945 |
| 2,404,688 | Bruson et al. | July 23, 1946 |
| 2,419,042 | Urbanski | Apr. 15, 1947 |
| 2,449,804 | D'Alelio | Sept. 21, 1948 |
| 2,464,062 | Strain | Mar. 8, 1949 |